May 25, 1937.  R. A. SANDBERG  2,081,603
MOTOR ROTOR HUB ASSEMBLY
Filed July 1, 1935
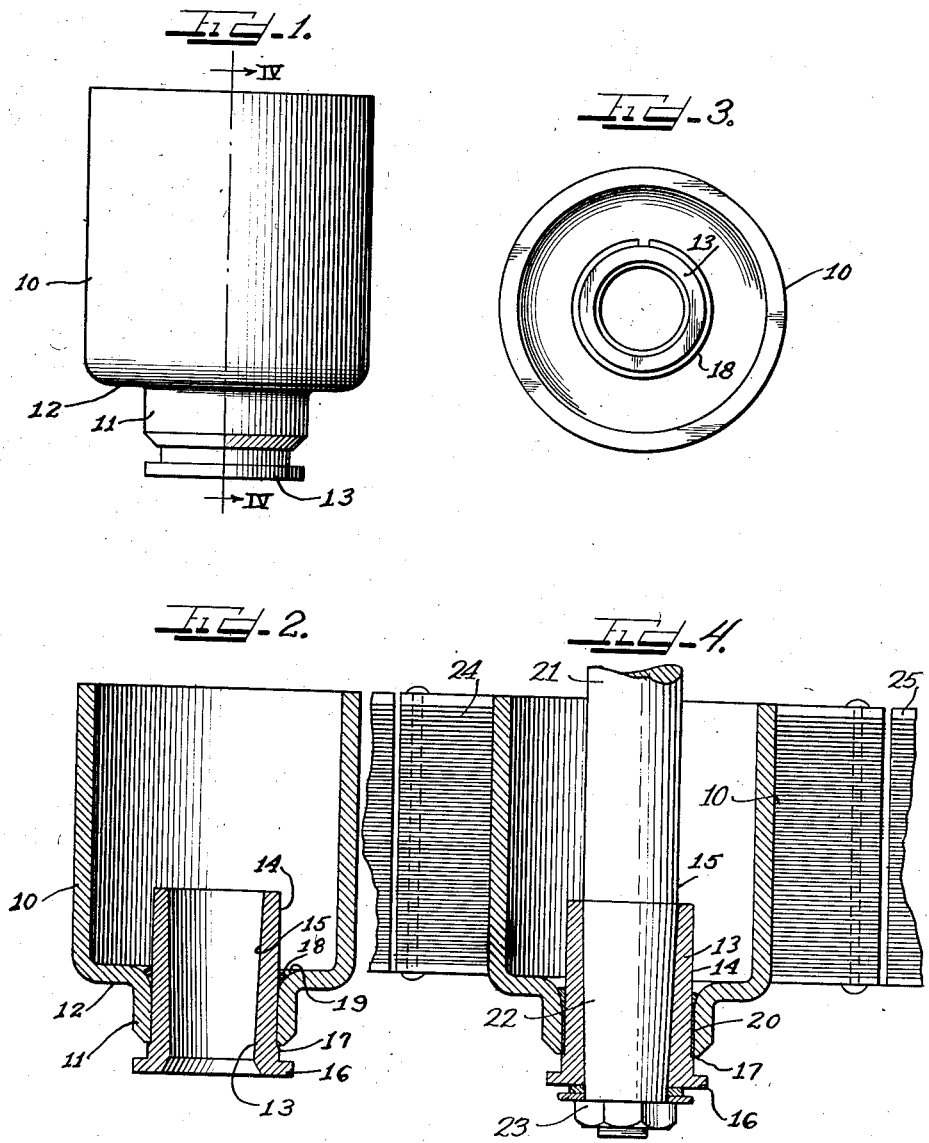

Patented May 25, 1937

2,081,603

UNITED STATES PATENT OFFICE 2,081,603

MOTOR ROTOR HUB ASSEMBLY

Ray A. Sandberg, North Chicago, Ill., assignor to Oakes Products Corporation, North Chicago, Ill., a corporation of Michigan Application July 1, 1935, Serial No. 29,261

3 Claims. (Cl. 171—252)

This invention relates to a motor rotor hub assembly of a type suitable for use in connection with motors for electrical refrigerators and the like, and to a method of manufacturing such assembly.

A motor rotor hub assembly of the type to which this invention pertains has heretofore been made from steel bar stock by a relatively expensive method. I have now found that the cost of manufacturing motor rotor hub assemblies of this type can be considerably reduced by making the assembly in two parts, one from a stamped and drawn metal sheet and the other from bar stock, and then uniting the two parts by copper brazing in a reducing atmosphere, such as hydrogen or the like.

It is therefore an object of this invention to provide a motor rotor hub assembly that can be manufactured at lower cost than heretofore.

It is a further important object of this invention to provide a motor rotor hub assembly formed in two parts and then copper brazed together in a reducing atmosphere.

Other and further important objects of this invention will become apparent from the following description and appended claims.

On the drawing:

Figure 1 is a plan view of a finished motor rotor hub assembly.

Figure 2 is a longitudinal sectional view of the same at one stage of its manufacture.

Figure 3 is an end elevational view of the assembly as shown in Fig. 2.

Figure 4 is a longitudinal sectional view taken substantially along the line IV—IV of Fig. 1 showing also the rotor core structure and a fragment of the stator core structure in section.

As shown on the drawing:

The reference numeral 10 indicates a metal sleeve comprising an elongated cylindrical body portion and a reduced neck portion 11 extending from one end thereof and joined thereto integrally by a shoulder 12. The member 10 may suitably be formed from sheet metal, such as steel, by a series of stamping and drawing operations, as will be well understood by one skilled in this art.

A hub 13 is formed from bar stock with a cylindrical outer surface 14 and a tapered inner surface 15. One end of the hub 13 is flanged as at 16 and a portion of the periphery adjacent the flange 16 is slightly larger in diameter than the cylindrical portion 14 to provide a shoulder 17 adapted, when the hub 13 is inserted into the neck portion 11 to abut against the end of said neck 11. The outside diameter of the cylindrical portion 14 is substantially the same as the inside diameter of the neck 11 so as to provide a close fit.

In assembled relation, the hub 13 is mounted upon a motor shaft 21 having a tapered end portion 22 adapted to be received by the tapered bore of said hub 13. The hub assembly is secured in place on said shaft 21 by means of a nut 23 threaded on to the extended end of said shaft 21. A motor rotor lamination assembly 24 is mounted upon the sleeve 10, preferably by a pressed fit. Stator laminations 25 surround the motor rotor laminations 24 in slightly spaced relation thereto, in accordance with usual motor construction.

As shown in Figs. 2 and 3, after the hub 13 has been inserted into the neck 11, a turn of wire 18 is laid in the fillet 19 between the inner end of the neck 11 and the cylindrical portion 14. The wire 18 may be formed of copper or brass or some other alloy of copper, but is preferably formed of substantially pure copper. The assembled parts with the wire 18 in place are then placed in a reducing atmosphere, such as hydrogen or a mixture of hydrogen, carbon monoxide or other reducing gases, and heated to a temperature above the melting point of the copper or brass, say between 1800 and 2100° F. Under these conditions the wire 18 melts and flows by capillarity between the inner surface of the neck 11 and the outer cylindrical periphery 14, as indicated at 20 (Fig. 4). The film of brazing metal 20 is greatly exaggerated in thickness for pictorial purposes only, since actually there is close metal to metal contact between the hub and neck portion and no continuous intervening film of the brazing metal.

The welded joint thus produced between the bushing and the neck of the sleeve is substantially as strong, or even stronger than the metal itself from which the sleeve and bushing are formed. The hub and sleeve may be made from any suitable ferrous alloy or steel. It is important in assembling the parts that the fit between the hub and the neck 11 be as close as possible and that the end of the neck be pressed against the shoulder 17 in order to insure a satisfactory weld.

It will be appreciated that the method described represents a considerable saving over the cost of manufacturing a similar motor rotor hub assembly from a single piece of bar stock, not only from the point of view of time and labor saved but also because of the saving in metal stock.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. An assembly comprising an elongated cylindrical body portion having a reduced neck extending from one end thereof, a hub member having a cylindrical outer surface inserted in said neck, said hub member having an annular shoulder engageable with the extremity of the neck for limiting the relative position of the hub member in said neck, and said hub member and body being brazed together by a continuous surface braze therebetween and inside of said body portion.

2. A motor rotor hub assembly comprising a cylindrical metal body member having a reduced cylindrical neck, a bushing brazed in said neck and extending into the interior of said member, said bushing having an annular shoulder engageable with the extremity of the neck for limiting the position of the bushing in the neck.

3. A motor rotor hub assembly comprising a drawn metal stamping of cylindrical shape having a neck of reduced diameter extending from one end thereof concentrically therewith, a metal hub member having a cylindrical outer surface inserted in said neck, said hub member having an outer annular shoulder engageable with the extremity of the neck for limiting entrance of the hub member into the neck, said hub member projecting into the interior of said stamping when positioned in said neck, and said hub member being brazed to said neck by a continuous surface braze between the hub member and the inner end of the neck, said braze constituting the sole connection between said stamping and hub member for preventing relative movement between them.

RAY A. SANDBERG.